United States Patent
Griffin et al.

(10) Patent No.: US 12,277,411 B2
(45) Date of Patent: Apr. 15, 2025

(54) CALCULATING LOWEST DEPENDENCY VERSION COMPATIBLE WITH DEPENDENCY SPECIFICATION

(71) Applicant: Red Hat, Inc., Raleigh, NC (US)

(72) Inventors: Leigh Griffin, Waterford (IE); Anne Mulhern, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 175 days.

(21) Appl. No.: 18/130,337

(22) Filed: Apr. 3, 2023

(65) Prior Publication Data
US 2024/0329951 A1    Oct. 3, 2024

(51) Int. Cl.
| | |
|---|---|
| *G06F 9/30* | (2018.01) |
| *G06F 8/34* | (2018.01) |
| *G06F 8/41* | (2018.01) |
| *G06F 8/71* | (2018.01) |
| G06F 16/22 | (2019.01) |
| G06F 16/23 | (2019.01) |

(Continued)

(52) U.S. Cl.
CPC .............. *G06F 8/43* (2013.01); *G06F 8/34* (2013.01); *G06F 8/423* (2013.01); *G06F 8/433* (2013.01); *G06F 8/71* (2013.01); *G06F 16/221* (2019.01); *G06F 16/2379* (2019.01); *G06F 21/568* (2013.01); *H04N 21/26258* (2013.01)

(58) Field of Classification Search
CPC ... G06F 8/34; G06F 8/423; G06F 8/71; G06F 8/433; G06F 16/2379; G06F 16/221; G06F 21/568; G06F 8/43; H04N 21/26258
See application file for complete search history.

(56) References Cited

U.S. PATENT DOCUMENTS

| | | |
|---|---|---|
| 7,076,764 B2 | 7/2006 | Kramer |
| 8,997,084 B2 | 3/2015 | Marndi et al. |
| 9,235,402 B2 | 1/2016 | Carpenter et al. |
| (Continued) | | |

OTHER PUBLICATIONS

Coghlan, Nick et al. "PEP 440—Version Identification and DependencySpecification", Python Enhancement Proposals, Mar. 18, 2013, 24 pages, https://github.com/python/peps/blob/main/pep-0440.txt.

(Continued)

*Primary Examiner* — Tuan A Vu
(74) *Attorney, Agent, or Firm* — Womble Bond Dickinson (US) LLP

(57) ABSTRACT

Embodiments of the present disclosure involve determining, for each package required for execution of an application, the lowest version that is compatible with a dependency specification of the package. For each of a set of packages required to execute an application: analyzing a dependency specification corresponding to the package to determine a set of relations, the set of relations defining version numbers of the package that are compatible with the application. The set of relations may be desugared to generate a basic format set of relations, and conflicting relations may be removed from the basic format set of relations. Duplicate relations may also be removed from the basic format set of relations to generate a deduplicated set of relations. A lowest version of the package that is compatible with the dependency specification may be determined based on operators used among the deduplicated set of relations.

20 Claims, 7 Drawing Sheets

(51) Int. Cl.
*G06F 21/56* (2013.01)
*H04N 21/262* (2011.01)

(56) References Cited

U.S. PATENT DOCUMENTS

| | | | |
|---|---|---|---|
| 9,348,582 B2 | 5/2016 | Pillgram-Larsen et al. | |
| 10,108,410 B2 | 10/2018 | Mahajan | |
| 10,684,846 B2 | 6/2020 | Ghiondea et al. | |
| 11,822,908 B1* | 11/2023 | Hatti | G06F 8/423 |
| 2016/0198012 A1* | 7/2016 | Fablet | H04N 21/26258 |
| | | | 709/231 |
| 2020/0357084 A1* | 11/2020 | Lerato Hunn | G06F 16/2379 |
| 2021/0191717 A1* | 6/2021 | Mayer | G06F 8/34 |
| 2023/0041129 A1* | 2/2023 | Terlecki | G06F 16/221 |
| 2024/0070289 A1* | 2/2024 | Wareus | G06F 21/568 |

OTHER PUBLICATIONS

Microsoft Corporation. "Package versioning", Feb. 3, 2023, 9 pages, https://learn.microsoft.com/en-us/nuget/concepts/package-versioning.

* cited by examiner

| Relation with sugared format operators | equivalent to | Desugared/expanded relation in basic format |
|---|---|---|
| =I.J.K | | =I.J.K |
| =I.J | | >=I.J.0, <I.(J+1).0 |
| =I | | >=I.0.0, <(I+1).0.0 |
| >I.J.K | | >I.J.K |
| >I.J | | >=I.(J+1).0 |
| >I | | >=(I+1).0.0 |
| >=I.J.K | | >=I.J.K |
| >=I.J | | >=I.J.0 |
| >=I | | >=I.0.0 |
| <I.J.K | | <I.J.K |
| <I.J | | <I.J.0 |
| <I | | <I.0.0 |

*FIG. 2B*

CALCULATING LOWEST DEPENDENCY VERSION COMPATIBLE WITH DEPENDENCY SPECIFICATION

TECHNICAL FIELD

Aspects of the present disclosure relate to distribution of software, and more particularly, to determining, for each dependency required for execution of an application, the lowest version that is compatible with a dependency specification of the dependency.

BACKGROUND

An application may require various packages and libraries (also referred to herein as dependencies) in order to successfully execute. The dependencies used to run applications (referred to as an application ecosystem) may be managed by a package manager such as Dandified YUM (DNF) or the RPM package manager. Applications may also be distributed using any appropriate package management software. A package manager may allow a developer to install, reinstall, remove, upgrade and verify packages with standard package management tools, use a database of installed packages to query and verify packages, use metadata to describe packages, their installation instructions, and other package parameters, and package software sources, patches and complete build instructions into source and binary packages. Different Linux distributions may utilize different package managers.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2B is a block diagram that illustrates example desugaring rules, in accordance with some embodiments of the present disclosure.

DETAILED DESCRIPTION

Figure 1A:
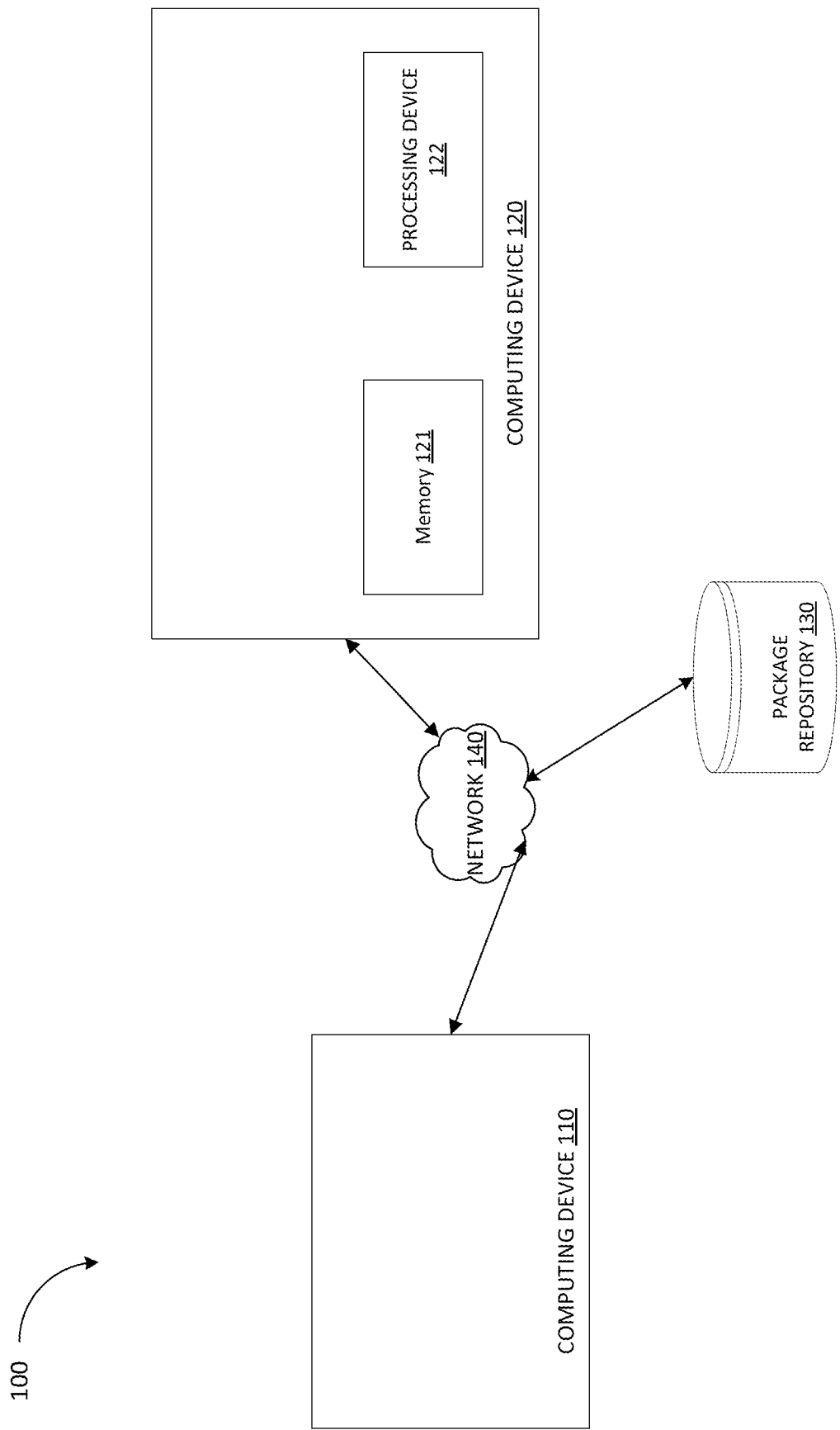
FIG. 1A is a block diagram that illustrates an example system, in accordance with some embodiments of the present disclosure.

Software is often distributed via packaging the code, which involves the use of dependency specifications to declare the dependencies required for successfully installing and executing packaged software. A dependency specification is a formal way to specify for a particular dependency, the range or ranges of dependency versions that are compatible with the software. A dependency version is a specially formatted numeric or other value attached to a particular instance of a dependency. The dependency versions of different instances of a dependency are comparable and serve to order the instances. As a developer is building the software, the developer may generate for each of the dependencies, a dependency specification that outlines the range or ranges of dependency versions that are compatible with the software. Each dependency may follow a semantic versioning scheme where version numbers and the way they change convey meaning about the underlying code, and what has been modified from one version of the code to the next. In essence, verifying compatibility with the lowest compatible version of a dependency should ensure compatibility with all other versions of the dependency. However, when distributing software, compatibility must be maintained both upstream from the developer and downstream from the developer.

Upstream may refer to the context where the developer or maintainer of a package releases that package. Usually, there is one context which is considered the canonical release spot. Often, the context is a language-specific repository of software projects. For example, crates.io serves as the context for Rust, while pypi.org serves as the context for Python. Sometimes, the repository is not language specific. For example, GitHub has become a canonical release context for some software projects, while other source code websites also try to provide the same language-agnostic service. Downstream may refer to a Linux distribution e.g., Fedora or RHEL (Red Hat Enterprise Linux). These Linux distributions include a working Linux kernel and significant amounts of software. Downstream packages code from upstream, and the goal for a downstream packager is to ensure that the software project works on the given Linux distribution for which it is packaged.

Developers of the software may benefit from dependency specifications that are very narrow (e.g., that specify a limited set of dependency versions). Having narrow dependency specifications is often the easiest way for an upstream developer to package their code. However, the most beneficial way to specify dependency specifications for downstream and most other users of the software is if the developer makes their dependency specifications as broad as possible, allowing every version of a dependency with which the software will execute. This means that, if a Linux distribution has just one version of a dependency that matches the corresponding dependency specification, it should be possible to package the software on the given Linux distribution. But it is undesirable for the dependency specification to be so broad that it also allows dependency versions that will not work correctly with their project in the dependency specification. This is because the Linux distribution may assume that dependency versions that will not work correctly are in fact the correct version, resulting in the Linux distribution building a package which fails to build from the source. Because developers must cater to both upstream and downstream users, it would be beneficial to provide the lowest dependency version that is compatible with a dependency specification of a package.

Embodiments of the present disclosure address the above and other issues by providing techniques for determining, for each package required for execution of an application, the lowest version that is compatible with a dependency specification of the package. For each of a set of packages required to execute an application: analyzing a dependency specification corresponding to the package to determine a set of relations, the set of relations defining version numbers of the package that are compatible with the application. The set of relations may be desugared to generate a basic format set of relations. Duplicate relations may be removed from the basic format set of relations to generate a deduplicated set of relations. A lowest version of the package that is compatible with the dependency specification may be determined based on operators used among the deduplicated set of relations.

FIG. 1A is a block diagram that illustrates an example system 100. As illustrated in FIG. 1A, the system 100 includes computing devices 110 and 120, a package repository 130 and a network 140. The computing devices 110 and 120 and the package repository 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g., cell towers), etc. The network 140 may carry communications (e.g., data, message, packets, frames, etc.) between computing device 110, computing device 120 and the package repository 130. Each of the computing devices 110 and 120, and the package repository 130 may include hardware such as processing device 122 (e.g., processors, central processing units (CPUs), memory 121 (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

Each of the computing devices 110 and 120, and the package repository 130 may comprise any suitable type of computing device or machine that has a programmable processor including, for example, server computers, desktop computers, laptop computers, tablet computers, smartphones, set-top boxes, etc. In some examples, the computing devices 110 and 120, and the package repository 130 may each comprise a single machine or may include multiple interconnected machines (e.g., multiple servers configured in a cluster). The computing devices 110 and 120, and the package repository 130 may be implemented by a common entity/organization or may be implemented by different entities/organizations. For example, computing device 110 may be operated by a first company/corporation and computing device 120 along with package repository 130 may be operated by a second company/corporation. The computing devices 110 and 120, and the package repository 130 may each execute or include an operating system (OS), as discussed in more detail below. The OSs of the computing devices 110 and 120 (shown in FIG. 1B as host OS 221), and the package repository 130 may manage the execution of other components (e.g., software, applications, etc.) and/or may manage access to the hardware (e.g., processors, memory, storage devices etc.) of their respective computing device.

Figure 1B:
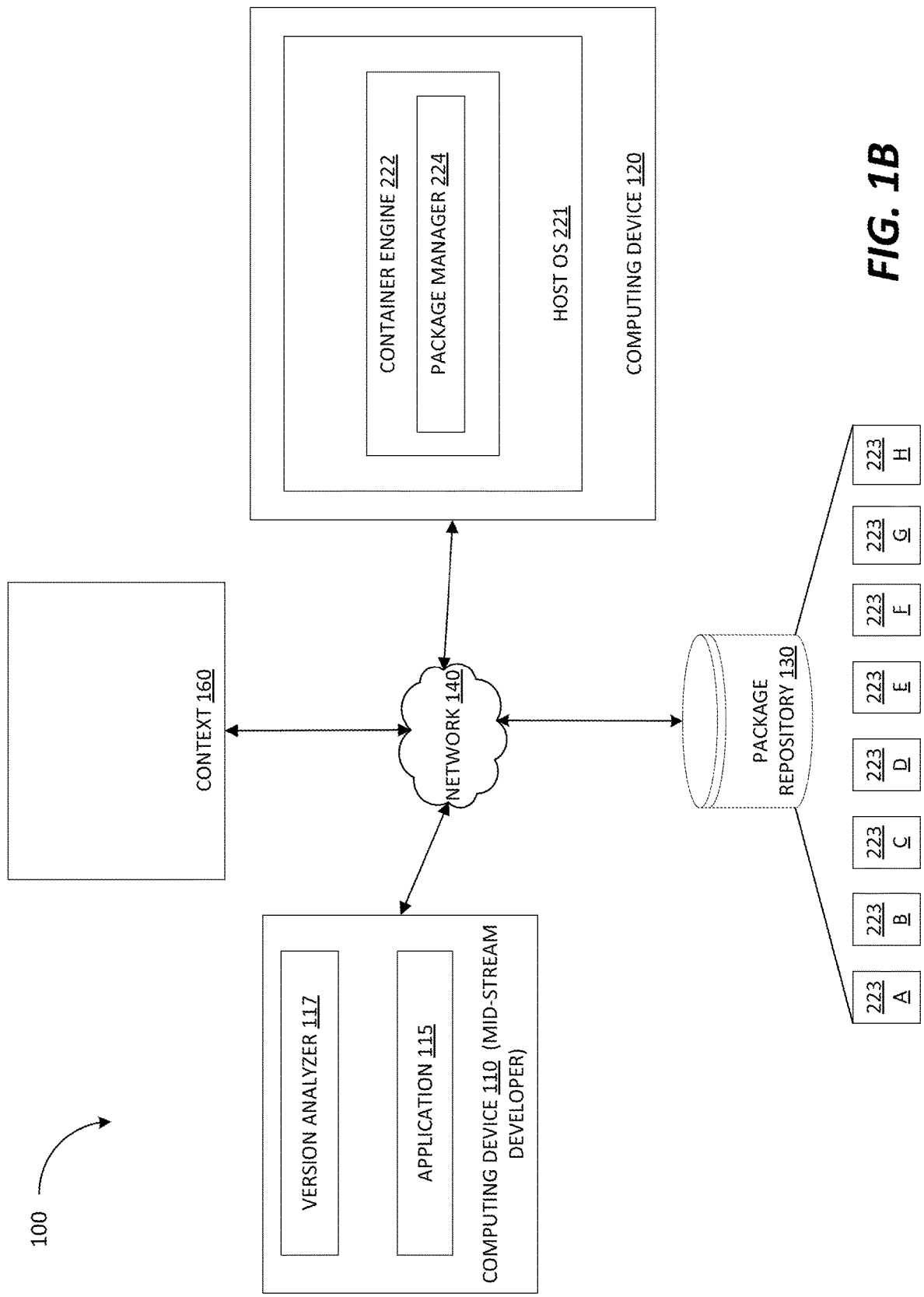
FIG. 1B is a block diagram that illustrates a detailed example system, in accordance with some embodiments of the present disclosure.

Referring to FIG. 1B, the computing device 120 may include a container engine 222 which executes on top of the host OS 221 of computing device 120. The container engine 222 may allow different containers to share the host OS 221 (e.g., the OS kernel, packages, binaries, libraries thereof etc.) and may also perform other functions, as discussed in more detail below. Containers (not shown) may share the OS kernel and packages of the host OS 221 with other containers (not shown) that are executing on the computing device 120. The container engine 222 may allow different containers to share the host OS 221 (including, e.g., the OS kernel as well as relevant packages including any associated libraries, binary and/or source files etc.) of the computing device 120. For example, the container engine 222 may multiplex the packages of the host OS 221 between multiple containers as discussed in further detail herein. The container engine 222 may also facilitate interactions between a container and the resources of the computing device 120 and may manage requests from the container to access certain packages of the host OS 221.

In addition, the package repository 130 may comprise a plurality of packages 223 (e.g., libraries, binary files and source files), each of which may provide certain functionality (e.g., for executing an application). The package repository 130 may comprise multiple repositories that store packages corresponding to a core set of underlying OS functionality, user space applications, runtime languages, and databases in support of various types of workloads and use cases, among others. The host OS 221 of the computing device 120 may also include a software package manager 224 that interfaces with repositories in the package repository 130 to search for packages 223, as well as install, update, and remove packages on the respective host OS. The software package manager 224 (hereinafter referred to as package manager 224) may be any appropriate package management software such as Dandified Yum, for example. The package manager 224 may automatically compute dependencies of an application and determine any actions required to install/execute the application and any corresponding dependencies. Each of the plurality of packages 223 may be in any appropriate format, such as e.g., the ".rpm" format. Stated differently, each package 223 may comprise an RPM file (e.g., based on Fedora, RHEL, etc.) or any other appropriate operating system packaging unit. The package manager 224 may install, update, and remove packages and their dependencies on their respective computing device. The package manager 224 may facilitate maintenance of packages 223 and their dependencies by automatically checking for further dependencies and determining the actions required to install those dependencies.

The computing device 110 may execute an application 115, which may be any application that requires certain packages 223 to facilitate its operation. The computing device 110 may represent e.g., an upstream developer of the application 115 and may also include functionality to automatically compute the dependencies of the application 115 and determine any actions required to install/execute the application 115 and any corresponding dependencies. The host OS 221 may represent a downstream Linux distribution on which the upstream developer wants application 115 to execute properly. FIG. 1B may also illustrate a context 170 where the upstream developer wants to release application 115. Thus, for each package 223 that the application 115 requires to be installed and executed, the upstream developer may wish to determine the lowest version of the package 223 that is compatible with the package's dependency specification. Thus, the computing device 110 may also include a version analyzer 117, which may include logic to perform some or all of the functions described herein for calculating the lowest compatible version of each package 223 (i.e., dependency) required for execution of application 115.

The application 115 may require a number of the packages 223 (e.g., packages 223A-E) in order to install and run it. As discussed herein, the packages required to install and run the application 115 may be also referred to herein as dependencies. Each package 223A-E may have a dependency specification 225 that specifies the version numbers of that package 223 that are compatible for successfully installing and running the application 115. Each dependency specification 225 may act as a guarantee that the application 115 will work with every version of the package 223 that is specified by it. Each package 223 may follow a semantic versioning scheme where version numbers and the way they change convey meaning about the underlying code and what has been modified from one version to the next. In essence, verifying compatibility with the lowest compatible version of a package 223 should ensure compatibility with all other compatible versions of the package 223.

Figure 2A:
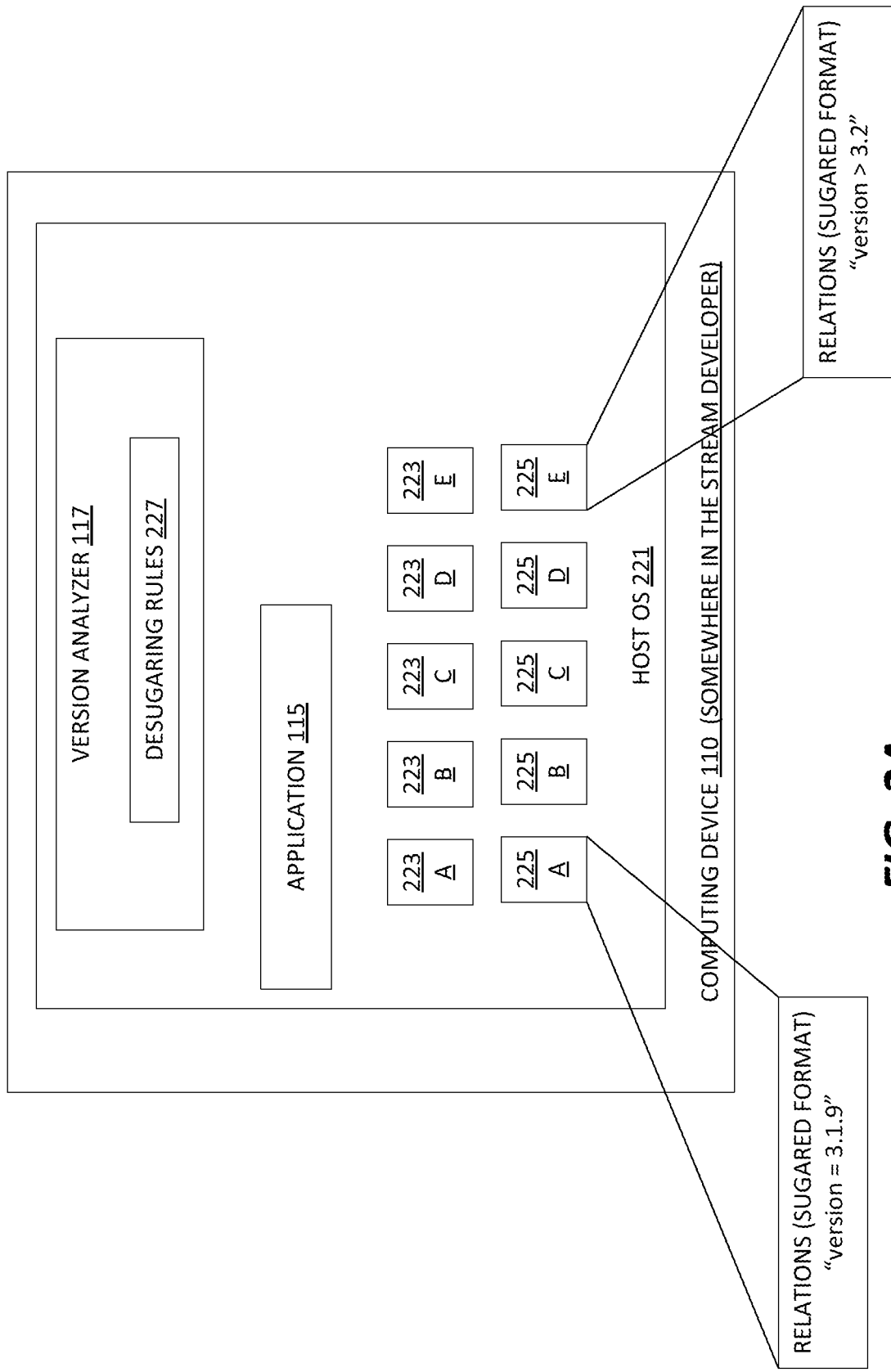
FIG. 2A is a block diagram that illustrates dependency specifications with relations in a sugared format, in accordance with some embodiments of the present disclosure.

Referring to FIG. 2A, each dependency specification 225 may comprise a set of relations defining the compatible version numbers for the corresponding package 223. For example, a first relation (basic format) of a dependency specification 225E may specify ">=3.2," indicating that version numbers greater than or equal to version 3.2 are compatible. Another relation (basic format) of the dependency specification 225E may specify "<4.0." Thus, the full dependency specification 225E may specify "version>=3.2, <4.0," indicating that version numbers greater than or equal to 3.2 and version numbers less than 4.0 are compatible.

For each package 223A-E, the version analyzer 117 may analyze the corresponding dependency specification 225 and identify the compatible versions. However, each relation in a dependency specification 225 may initially be represented using syntactic sugar, which is a shorthand that is often easier for programmers to write. For example, a relation in a dependency specification 225 may initially be represented as e.g., "version=3.1.9," which may be the sugared format of "version>=3.1.9, <4.0.0" (which is the basic format). This is because the "=" (equivalency) operator in syntactic sugar is not a true equivalency operator but instead refers to a more complex combination of operators. Indeed, operators in syntactic sugar are often complex and not straight forward as they can refer to a more complex combination of operators instead of their traditional meaning. Thus, the version analyzer 117 may initially desugar each of the relations in the dependency specification 225. More specifically, for each relation in the dependency specification 225, the version analyzer 117 may remove the shorthand and expand the relation to its more complete basic format. The basic format may allow only a limited number of more simple operators e.g., >=(greater than/equal to), =(actual equivalency), or >(less than). By converting the set of sugared format relations in the dependency specification 225 to a set of relations in their basic format (which utilizes fewer operators which are also simpler), the dependency specification 224 may be easier to analyze than if it included a set of relations with a larger and more complex set of operators.

The version analyzer 117 may utilize a set of desugaring rules 227 for desugaring relations in a dependency specification. Each relation in a dependency specification may be compared to the set of rules 227 in order to determine the basic format of the relation. Examples of the desugaring rules 227 are presented in the table of FIG. 2B.

It should be noted that the process of desugaring a dependency specification 225 may result in the dependency specification 225 having a larger number of relations since the desugaring process may make multiple desugared relations out of a single sugared relation. For example, the version analyzer 117 may desugar "version=3.1.9" (sugared format) into "version>=3.1.9, <4.0.0" (basic format). Upon completion of the desugaring process, the version analyzer 117 may begin its lowest dependency version analysis of the relations (now in the basic format) in the dependency specification 225.

In some situations, two relations (now in basic format) may be in conflict (e.g., "version>=5, <4"). However, all relations must be satisfied in order for the lowest dependency version to be found. Thus, for the pair of relations that are in conflict, the version analyzer 117 may randomly select one of the relations in conflict to discard and continue executing (as discussed herein). If no solution is found, the version analyzer 117 may discard the other relation and execute again. In some embodiments, the version analyzer 117 may initially keep the relation that specifies the lower version (and discard the other relation) by default. In other embodiments, the version analyzer 117 may look downstream to the host OS 221 and compare the version number of both relations to the version numbers that are available on the host OS 221 (i.e., the Linux distribution). The version analyzer 117 may initially discard the relation having a version number that is not available on the host OS 221. The version analyzer 117 may perform these steps for each pair of relations that are in conflict. In some embodiments, if a particular relation conflicts with more than one other relation, then the version analyzer 117 may select that particular relation and discard it.

As a result of the desugaring process, a dependency specification 225 may have duplicate (basic format) relations (e.g., "version>=5.0.0, <9.0.0, <9.0.0"). In this case, the version analyzer 117 may execute a textual operation to identify each relation that has a duplicate relation and then discard each duplicate relation, resulting in a deduplicated set of relations before continuing its analysis as discussed herein.

If the version analyzer 117 determines that there is only a single relation among the deduplicated set of relations that includes an equivalency ("=") operator, the version analyzer 117 may determine whether that relation is compatible with all of the other relations in the deduplicated set of relations. If so, the version analyzer 117 may return it as the solution (i.e., the lowest version compatible with the dependency specification 225).

If the version analyzer 117 determines that there are multiple relations among the deduplicated set of relations that include the "=" operator, this may indicate that the lowest compatible version problem is unsatisfiable. Therefore, in situations where two or more relations have the "=" operator, the version analyzer 117 may randomly select one of those relations to keep and discard the others and continue executing (as discussed herein). If no solution is found, the version analyzer 117 may select a different relation having the "=" operator to keep (and discard the others) and continue executing again, and may continue in this way until a solution is found.

If the version analyzer 117 determines that there are only ">=" and "<" operators left among the deduplicated set of relations, the version analyzer 117 may select the ">=x" relation where x has the largest value and select the "<y" relation where y has the smallest value. If y<=x, there is no solution and the version analyzer 117 may terminate the operation. If y>x, the version analyzer 117 may determine x to be the solution and return it.

In some embodiments, in response to determining that there are multiple relations among the deduplicated set of relations that include the "=" operator, or that there are only ">=" and "<" operators left among the deduplicated set of relations and y<=x, the version analyzer 117 may attempt to reconcile the discrepancy. More specifically, the version analyzer 117 may clone the corresponding package 223 into a new repository (not shown), increase the version number of one of the relations causing the determination of no solution, and re-execute the lowest dependency version analysis. Upon determining a lowest version of the corresponding package 223 that is compatible with the dependency specification 225, the analyzer 117 may fetch the package 223 from the package repository 130, deploy the package 223 into a VM or container and attempt to compile the package 223 to ensure compilability. The version analyzer 117 may also run other smoke tests/unit tests in order to confirm compilability.

In some embodiments, the version analyzer 117 may maintain a table of replacement packages (not shown). The table may include packages that have no functional difference with those packages 223 required for execution of the application 115. When the version analyzer 117 attempts to reconcile a discrepancy between relations as described hereinabove, instead of increasing the version number of one of the relations, the version analyzer 117 may allow for the package 223 in question to be substitute with a package from the table that has no functional difference with the package 223. For example, a package 223 that is a dependency of application 115 may be a library, which is language native. The table of replacement packages may include a replacement package that is a library implemented via a Foreign Function Interface (FFI) to a different-language library. The package 223 may be preferred where it is desirable to get a fully statically compiled executable (a goal that can be important in a containerized environment), and the replacement package may be preferred because it would be considered more reliable (e.g., because it is more fully featured, or because the code is more mature). However, functionally there is no difference. Thus, in response to determining a discrepancy between version numbers of different relations in a dependency specification of the package 223, the version analyzer 117 may decide to replace the package 223 with the replacement package.

In another example, a package 223 that is a dependency of application 115 may be logging software that is ideal for constrained environments, while the table of replacement packages may include a replacement package that is logging software that is more suitable for other types of distributions. However, each logging software may provide a log in which log entries may be logged by the application 115. Thus, in response to determining a discrepancy between version numbers of different relations in a dependency specification of the package 223, the version analyzer 117 may decide to replace the package 223 with the replacement package. Other examples of replacement packages may include test execution suites, or any other appropriate safe to swap packages that may be presented as viable solutions to avoid a compatibility conflict. Once the package 223 has been replaced, the version analyzer 117 continue analyzing it to determine the lowest dependency version compatible with its dependency specification, as described hereinabove.

Once the version analyzer 117 has determined the lowest dependency version for each of the packages 223A-E as discussed hereinabove, the version analyzer 117 may annotate each dependency specification 225 with the determined lowest version of the corresponding package 223 that is compatible with the dependency specification 225.

Figure 3:
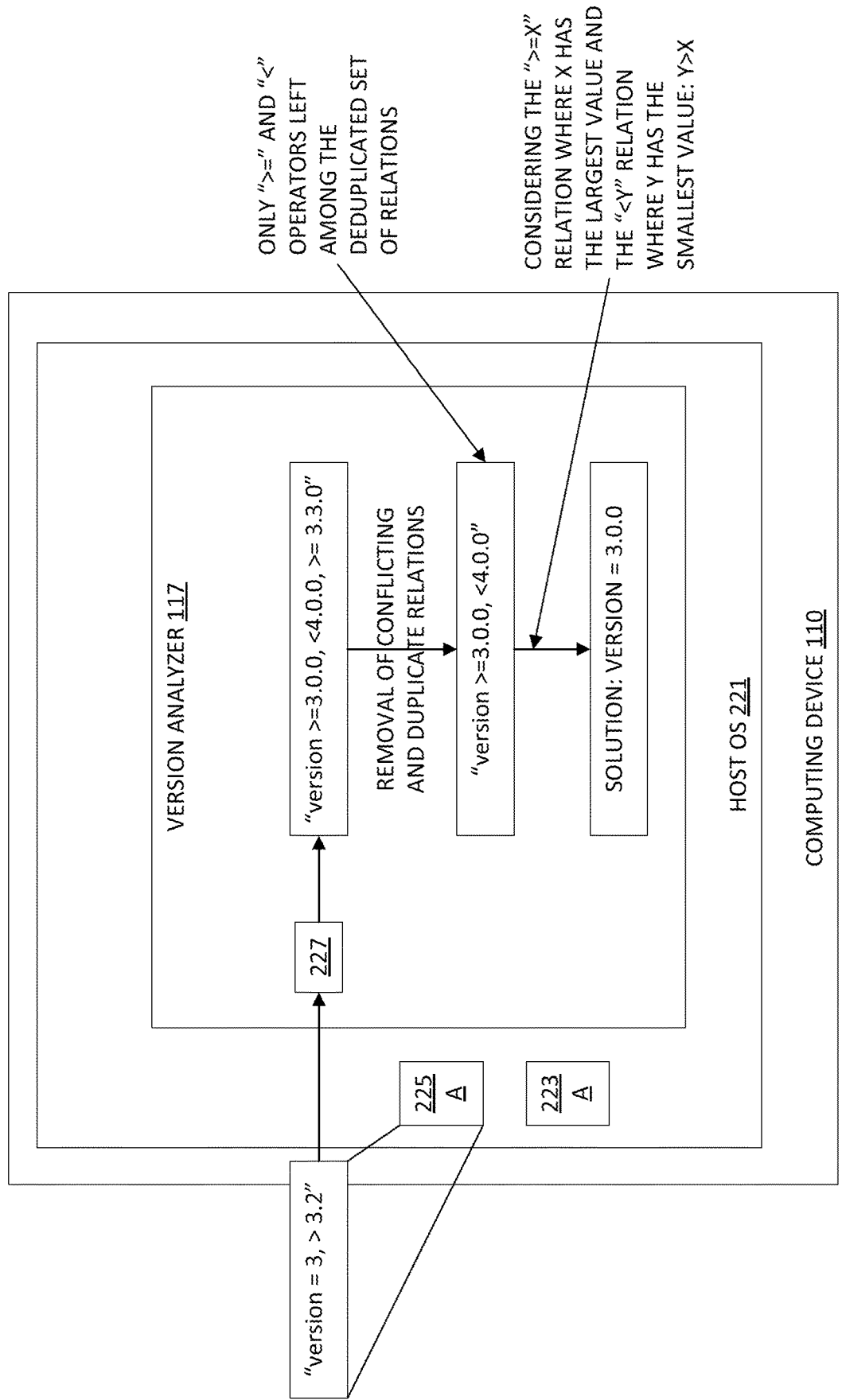
FIG. 3 is a block diagram that illustrates an example process of identifying for a dependency of an application, the lowest version that is compatible with the dependency specification of the dependency, in accordance with some embodiments of the present disclosure.

FIG. 3 illustrates the version analyzer 117 performing an example lowest dependency version analysis of package 223A in accordance with some embodiments of the present disclosure. The dependency specification 225A corresponding to package 223A may specify "version=3, >3.2" (sugared format). Upon applying the desugaring rules 227 to each of the relations, the version analyzer 117 may convert each relation to its basic format, resulting in the dependency specification 225A (basic format) specifying "version>=3.0.0, <4.0.0, >=3.3.0."

The version analyzer 117 may determine that there is a conflict among the relations >=3.0.0 and >=3.3.0 in the dependency specification 225A. In the example of FIG. 3, the version analyzer 117 may be configured to initially keep the relation that specifies the lower version and thus may keep the relation >=3.0.0 and discard the relation >=3.3.0. The version analyzer 117 may then determine that there are no duplicates, and thus the deduplicated set of relations may include ">=3.0.0, <4.0.0." The version analyzer 117 may determine that there are only ">=" and "<" operators left among the deduplicated set of relations, and may select the ">=x" relation where x has the largest value (i.e., 3.0.0) and select the "<y" relation where y has the smallest value (i.e., 4.0.0). Because y>x (4.0.0>3.0.0), the version analyzer 117 may determine version 3.0.0 to be the solution and return it.

Figure 4:
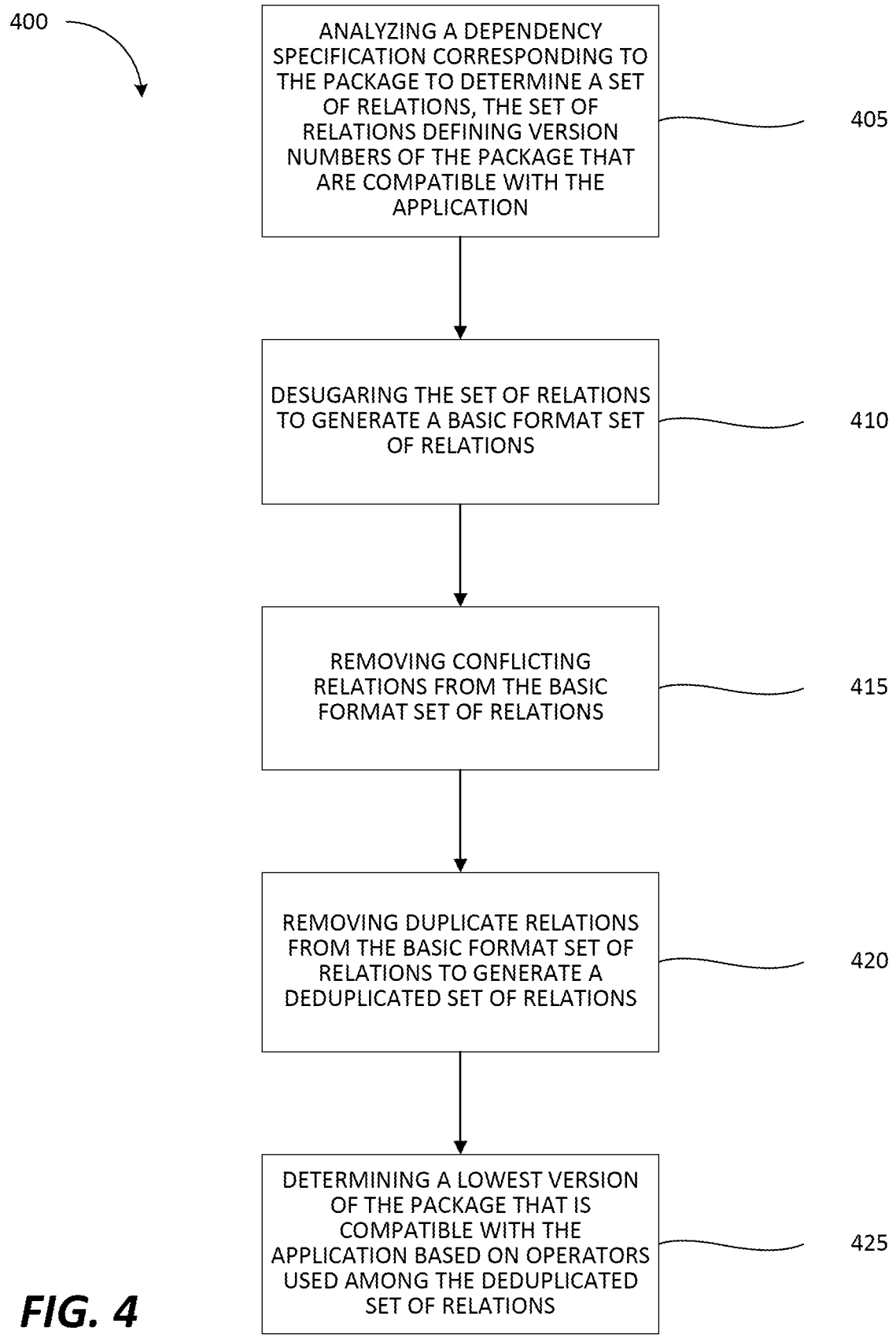
FIG. 4 is a flow diagram of a method of determining for each dependency required for execution of an application, the lowest version that is compatible with a dependency specification of the dependency, in accordance with some embodiments of the present disclosure.

FIG. 4 is a flow diagram of a method 400 of determining for each dependency required for execution of an application, the lowest version that is compatible with a dependency specification of the dependency, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by computing devices 110 and 120 illustrated in FIGS. 2A and 3.

Referring also to FIG. 2A, at block 405, for each package 223A-E, the version analyzer 117 may analyze the corresponding dependency specification 225 and identify the compatible versions. However, each relation in a dependency specification 225 may initially be represented using syntactic sugar, which is a shorthand that is often easier for programmers to write. For example, a relation in a dependency specification 225 may initially be represented as e.g., "version=3.1.9," which may be the sugared format of "version>=3.1.9, <4.0.0" (which is the basic format). This is because the "=" (equivalency) operator in syntactic sugar is not a true equivalency operator but instead refers to a more complex combination of operators. Indeed, operators in syntactic sugar are often complex and not straight forward as they can refer to a more complex combination of operators instead of their traditional meaning. Thus, at block 410, the version analyzer 117 may initially desugar each of the relations in the dependency specification 225. More specifically, for each relation in the dependency specification 225, the version analyzer 117 may remove the shorthand and expand the relation to its more complete basic format. The basic format may allow only a limited number of more simple operators e.g., >=(greater than/equal to), =(actual equivalency), or > (less than). By converting the set of sugared format relations in the dependency specification 225 to a set of relations in their basic format (which utilizes fewer operators which are also simpler), the dependency specification 224 may be easier to analyze than if it included a set of relations with a larger and more complex set of operators.

The version analyzer 117 may utilize a set of desugaring rules 227 for desugaring relations in a dependency specification. Each relation in a dependency specification may be compared to the set of rules 227 in order to determine the basic format of the relation. Examples of the desugaring rules 227 are presented in the table of FIG. 2B.

It should be noted that the process of desugaring a dependency specification 225 may result in the dependency specification 225 having a larger number of relations since the desugaring process may make multiple desugared relations out of a single sugared relation. For example, the version analyzer 117 may desugar "version=3.1.9" (sugared format) into "version>=3.1.9, <4.0.0" (basic format). Upon completion of the desugaring process, the version analyzer 117 may begin its lowest dependency version analysis of the relations (now in the basic format) in the dependency specification 225.

In some situations, two relations (now in basic format) may be in conflict (e.g., "version>=5, <4"). However, all relations must be satisfied in order for the lowest dependency version to be found. Thus, at block 415, for the pair of relations that are in conflict, the version analyzer 117 may randomly select one of the relations in conflict to discard and continue executing (as discussed herein). If no solution is found, the version analyzer 117 may discard the other relation and execute again. In some embodiments, the version analyzer 117 may initially keep the relation that specifies the lower version (and discard the other relation) by default. In other embodiments, the version analyzer 117 may look downstream to the host OS 221 and compare the version number of both relations to the version numbers that are available on the host OS 221 (i.e., the Linux distribution). The version analyzer 117 may initially discard the relation having a version number that is not available on the host OS 221. The version analyzer 117 may perform these steps for each pair of relations that are in conflict. In some embodiments, if a particular relation conflicts with more than one other relation, then the version analyzer 117 may select that particular relation and discard it.

As a result of the desugaring process, a dependency specification 225 may have duplicate (basic format) relations (e.g., "version>=5.0.0, <9.0.0, <9.0.0"). In this case, at block 420, the version analyzer 117 may execute a textual operation to identify each relation that has a duplicate relation and then discard each duplicate relation, resulting in a deduplicated set of relations before continuing its analysis as discussed herein.

At block 425, if the version analyzer 117 determines that there is only a single relation among the deduplicated set of relations that includes an equivalency ("=") operator, the version analyzer 117 may determine whether that relation is compatible with all of the other relations in the deduplicated set of relations. If so, the version analyzer 117 may return it as the solution (i.e., the lowest version compatible with the dependency specification 225).

If the version analyzer 117 determines that there are multiple relations among the deduplicated set of relations that include the "=" operator, this may indicate that the lowest compatible version problem is unsatisfiable. Therefore, in situations where two or more relations have the "=" operator, the version analyzer 117 may randomly select one of those relations to keep and discard the others and continue executing (as discussed herein). If no solution is found, the version analyzer 117 may select a different relation having the "=" operator to keep (and discard the others) and continue executing again, and may continue in this way until a solution is found.

If the version analyzer 117 determines that there are only ">=" and "<" operators left among the deduplicated set of relations, the version analyzer 117 may select the ">=x" relation where x has the largest value and select the "<y" relation where y has the smallest value. If y<=x, there is no solution and the version analyzer 117 may terminate the operation. If y>x, the version analyzer 117 may determine x to be the solution and return it.

In some embodiments, in response to determining that there are multiple relations among the deduplicated set of relations that include the "=" operator, or that there are only ">=" and "<" operators left among the deduplicated set of relations and y<=x, the version analyzer 117 may attempt to reconcile the discrepancy. More specifically, the version analyzer 117 may clone the corresponding package 223 into a new repository (not shown), increase the version number of one of the relations causing the determination of no solution, and re-execute the lowest dependency version analysis. Upon determining a lowest version of the corresponding package 223 that is compatible with the dependency specification 225, the analyzer 117 may fetch the package 223 from the package repository 130, deploy the package 223 into a VM or container and attempt to compile the package 223 to ensure compatibility. The version analyzer 117 may also run other smoke tests/unit tests in order to confirm compatibility.

Once the version analyzer 117 has determined the lowest dependency version for each of the packages 223A-E as discussed hereinabove, the version analyzer 117 may annotate each dependency specification 225 with the determined lowest version of the corresponding package 223 that is compatible with the dependency specification 225.

Figure 5:
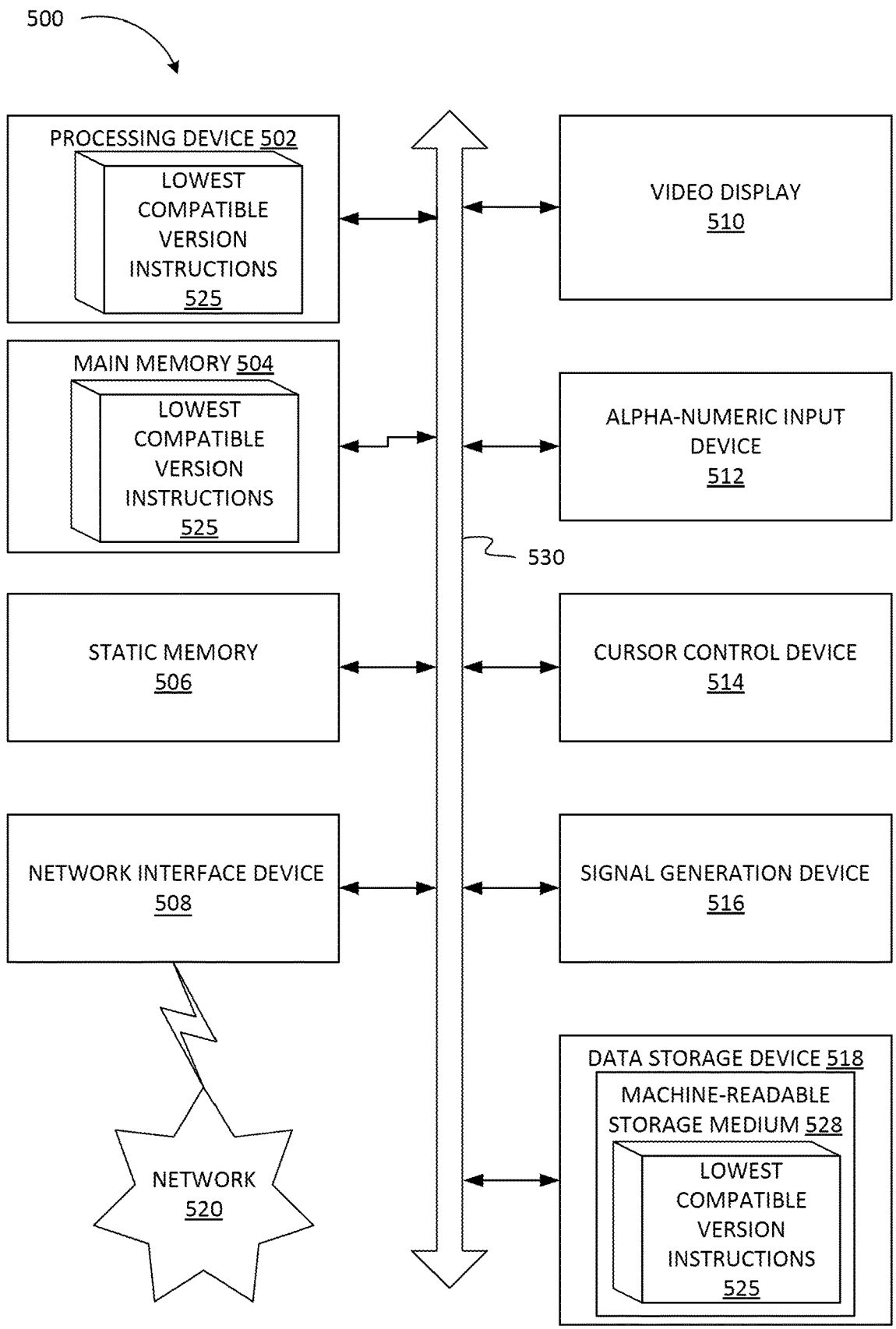
FIG. 5 is a block diagram of an example computing device that may perform one or more of the operations described herein, in accordance with some embodiments of the present disclosure.

FIG. 5 illustrates a diagrammatic representation of a machine in the example form of a computer system 500 within which a set of instructions, for causing the machine to perform any one or more of the methodologies discussed herein for determining, for each dependency required for execution of an application, the lowest version that is compatible with a dependency specification of the dependency.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute lowest compatible version instructions 525, for performing the operations and steps discussed herein.

The data storage device 518 may include a machine-readable storage medium 528, on which is stored one or more sets of lowest compatible version instructions 525 (e.g., software) embodying any one or more of the methodologies of functions described herein. The lowest compatible version instructions 525 may also reside, completely or at least partially, within the main memory 504 or within the processing device 502 during execution thereof by the computer system 500; the main memory 504 and the processing device 502 also constituting machine-readable storage media. The lowest compatible version instructions 525 may further be transmitted or received over a network 520 via the network interface device 508.

The machine-readable storage medium 528 may also be used to store instructions to perform a method for object analysis/validation event publishing, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
    for each of a set of packages required to execute an application:
        analyzing, by a processing device, a dependency specification corresponding to the package to determine a set of relations, the set of relations defining version numbers of the package that are compatible with the application;
        desugaring the set of relations to generate a basic format set of relations;
        removing conflicting relations from the basic format set of relations;
        removing duplicate relations from the basic format set of relations to generate a deduplicated set of relations; and
        determining a lowest version of the package that is compatible with the dependency specification based on operators used among the deduplicated set of relations.

2. The method of claim 1, further comprising:
    for each of the set of packages required to execute the application, annotating the corresponding dependency specification with the determined lowest version of the package.

3. The method of claim 1, wherein desugaring the set of relations comprises:
    comparing each relation of the set of relations to a set of desugaring rules to determine a basic format of the relation.

4. The method of claim 1, wherein determining the lowest version of the package that is compatible with the dependency specification comprises:
    in response to determining that there is only a single relation among the deduplicated set of relations that includes an equivalency operator, determining whether the single relation is compatible with each of the other relations in the deduplicated set of relations; and
    if the single relation is compatible with each of the other relations in the deduplicated set of relations, identifying a version number specified by the single relation as the lowest version of the package that is compatible with the application.

5. The method of claim 1, wherein determining the lowest version of the package that is compatible with the dependency specification comprises:
    in response to determining that there are multiple relations among the deduplicated set of relations that includes an equivalency operator, randomly selecting a first relation of the multiple relations and discarding the others;
    determining whether the first relation is compatible with each of the other relations in the deduplicated set of relations; and
    if the first relation is compatible with each of the other relations in the deduplicated set of relations, identifying a version number specified by the first relation as the lowest version of the package that is compatible with the application.

6. The method of claim 5, further comprising:
    in response to determining that the first relation is not compatible with each of the other relations in the deduplicated set of relations:
    randomly selecting a second relation of the multiple relations and discarding the others;
    determining whether the second relation is compatible with each of the other relations in the deduplicated set of relations; and
    if the second relation is compatible with each of the other relations in the deduplicated set of relations, identifying a version number specified by the second relation as the lowest version of the package that is compatible with the application.

7. The method of claim 1, wherein determining the lowest version of the package that is compatible with the application comprises:
    in response to determining that relations within the deduplicated set of relations include only greater than/equal to operators and less than operators:
        identifying a largest version number corresponding to a greater than/equal to operator;
        identifying a smallest version number corresponding to a less than operator; and
        if the smallest version number is less than or equal to the largest version number, identifying the smallest version number as the lowest version of the package that is compatible with the application.

8. A system comprising:
    a memory; and
    a processing device operatively coupled to the memory, the processing device to:
        for each of a set of packages required to execute an application:
            analyze a dependency specification corresponding to the package to determine a set of relations, the set of relations defining version numbers of the package that are compatible with the application;
            desugar the set of relations to generate a basic format set of relations;
            remove conflicting relations from the basic format set of relations;
            remove duplicate relations from the basic format set of relations to generate a deduplicated set of relations; and
            determine a lowest version of the package that is compatible with the dependency specification based on operators used among the deduplicated set of relations.

9. The system of claim 8, wherein the processing device is further to:

for each of the set of packages required to execute the application, annotate the corresponding dependency specification with the determined lowest version of the package.

10. The system of claim 8, wherein to desugar the set of relations, the processing device is to:
compare each relation of the set of relations to a set of desugaring rules to determine a basic format of the relation.

11. The system of claim 8, wherein to determine the lowest version of the package that is compatible with the dependency specification, the processing device is to:
in response to determining that there is only a single relation among the deduplicated set of relations that includes an equivalency operator, determine whether the single relation is compatible with each of the other relations in the deduplicated set of relations; and
if the single relation is compatible with each of the other relations in the deduplicated set of relations, identify a version number specified by the single relation as the lowest version of the package that is compatible with the application.

12. The system of claim 8, wherein to determine the lowest version of the package that is compatible with the dependency specification, the processing device is to:
in response to determining that there are multiple relations among the deduplicated set of relations that includes an equivalency operator, randomly select a first relation of the multiple relations and discarding the others;
determine whether the first relation is compatible with each of the other relations in the deduplicated set of relations; and
if the first relation is compatible with each of the other relations in the deduplicated set of relations, identify a version number specified by the first relation as the lowest version of the package that is compatible with the application.

13. The system of claim 12, wherein the processing device is further to:
in response to determining that the first relation is not compatible with each of the other relations in the deduplicated set of relations:
randomly select a second relation of the multiple relations and discarding the others;
determining whether the second relation is compatible with each of the other relations in the deduplicated set of relations; and
if the second relation is compatible with each of the other relations in the deduplicated set of relations, identify a version number specified by the second relation as the lowest version of the package that is compatible with the application.

14. The system of claim 8, wherein to determine the lowest version of the package that is compatible with the application, the processing device is to:
in response to determining that relations within the deduplicated set of relations include only greater than/equal to operators and less than operators:
identify a largest version number corresponding to a greater than/equal to operator;
identify a smallest version number corresponding to a less than operator; and
if the smallest version number is less than or equal to the largest version number, identify the smallest version number as the lowest version of the package that is compatible with the application.

15. A non-transitory computer-readable medium having instructions stored thereon which, when executed by a processing device, cause the processing device to:
for each of a set of packages required to execute an application:
analyze a dependency specification corresponding to the package to determine a set of relations, the set of relations defining version numbers of the package that are compatible with the application;
desugar the set of relations to generate a basic format set of relations;
remove conflicting relations from the basic format set of relations;
remove duplicate relations from the basic format set of relations to generate a deduplicated set of relations; and
determine a lowest version of the package that is compatible with the dependency specification based on operators used among the deduplicated set of relations.

16. The non-transitory computer-readable medium of claim 15, wherein the processing device is further to:
for each of the set of packages required to execute the application, annotate the corresponding dependency specification with the determined lowest version of the package.

17. The non-transitory computer-readable medium of claim 15, wherein to desugar the set of relations, the processing device is to:
compare each relation of the set of relations to a set of desugaring rules to determine a basic format of the relation.

18. The non-transitory computer-readable medium of claim 15, wherein to determine the lowest version of the package that is compatible with the dependency specification, the processing device is to:
in response to determining that there is only a single relation among the deduplicated set of relations that includes an equivalency operator, determine whether the single relation is compatible with each of the other relations in the deduplicated set of relations; and
if the single relation is compatible with each of the other relations in the deduplicated set of relations, identify a version number specified by the single relation as the lowest version of the package that is compatible with the application.

19. The non-transitory computer-readable medium of claim 15, wherein to determine the lowest version of the package that is compatible with the dependency specification, the processing device is to:
in response to determining that there are multiple relations among the deduplicated set of relations that includes an equivalency operator, randomly select a first relation of the multiple relations and discarding the others;
determine whether the first relation is compatible with each of the other relations in the deduplicated set of relations; and
if the first relation is compatible with each of the other relations in the deduplicated set of relations, identify a version number specified by the first relation as the lowest version of the package that is compatible with the application.

20. The non-transitory computer-readable medium of claim 19, wherein the processing device is further to:
in response to determining that the first relation is not compatible with each of the other relations in the deduplicated set of relations:

randomly select a second relation of the multiple relations and discarding the others;
determining whether the second relation is compatible with each of the other relations in the deduplicated set of relations; and
if the second relation is compatible with each of the other relations in the deduplicated set of relations, identify a version number specified by the second relation as the lowest version of the package that is compatible with the application.

* * * * *